(12) United States Patent
Seo et al.

(10) Patent No.: US 10,517,051 B2
(45) Date of Patent: Dec. 24, 2019

(54) METHOD FOR RECEIVING DOWNLINK SIGNAL BY TERMINAL IN WIRELESS COMMUNICATION SYSTEM, AND DEVICE THEREFOR

(71) Applicant: LG Electronics Inc., Seoul (KR)

(72) Inventors: Hanbyul Seo, Seoul (KR); Jonghyun Park, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/082,787

(22) PCT Filed: Mar. 9, 2017

(86) PCT No.: PCT/KR2017/002547
§ 371 (c)(1),
(2) Date: Sep. 6, 2018

(87) PCT Pub. No.: WO2017/155321
PCT Pub. Date: Sep. 14, 2017

(65) Prior Publication Data
US 2019/0090208 A1 Mar. 21, 2019

Related U.S. Application Data

(60) Provisional application No. 62/306,007, filed on Mar. 9, 2016.

(51) Int. Cl.
*H04W 52/48* (2009.01)
*H04L 1/16* (2006.01)
(Continued)

(52) U.S. Cl.
CPC .............. *H04W 52/48* (2013.01); *H04L 1/16* (2013.01); *H04L 1/18* (2013.01); *H04L 5/0055* (2013.01); *H04W 28/04* (2013.01); *H04W 52/36* (2013.01)

(58) Field of Classification Search
CPC ......... H04L 5/0055; H04L 1/16; H04W 52/48
(Continued)

(56) References Cited

U.S. PATENT DOCUMENTS

2007/0086422 A1 4/2007 Kim et al.
2008/0101285 A1* 5/2008 Venkatachalam ..... H04L 1/1607
370/329

(Continued)

OTHER PUBLICATIONS

Extended European Search Report in European Application No. 17763582.8, dated Aug. 28, 2019, 10 pages.
(Continued)

*Primary Examiner* — John J Lee
(74) *Attorney, Agent, or Firm* — Fish & Richardson P.C.

(57) ABSTRACT

Disclosed herein is a method for transmitting a signal to or receiving a signal from a base station by a terminal in a wireless communication system. Specifically, the method comprises the steps of: receiving a first packet from the base station; transmitting, to the base station, a negative-ACK (NACK) response to the first packet; receiving a second packet from the base station and determining whether an error has occurred in the NACK response to the first packet; and transmitting, to the base station, information on whether an error has occurred in the NACK response to the first packet.

12 Claims, 9 Drawing Sheets

(51) Int. Cl.
*H04L 1/18* (2006.01)
*H04W 28/04* (2009.01)
*H04W 52/36* (2009.01)
*H04L 5/00* (2006.01)

(58) Field of Classification Search
USPC ......... 455/452.1, 452.2, 509, 522, 69, 67.11, 455/67.13
See application file for complete search history.

(56) References Cited

U.S. PATENT DOCUMENTS

| | | | |
|---|---|---|---|
| 2010/0029322 A1* | 2/2010 | Englund | ............... H04L 1/1692 |
| | | | 455/522 |
| 2010/0235705 A1 | 9/2010 | Kim et al. | |
| 2011/0044243 A1 | 2/2011 | Yi et al. | |
| 2013/0266001 A1* | 10/2013 | Peisa | ..................... H04L 1/1887 |
| | | | 370/350 |

OTHER PUBLICATIONS

LG Electronics Inc., "Consideration on ARQ Mechanism," R2-062777, 3GPP TSG-RAN WG2 #55, Oct. 9-13, 2006, Seoul, Korea, 8 pages.

\* cited by examiner

FIG. 2
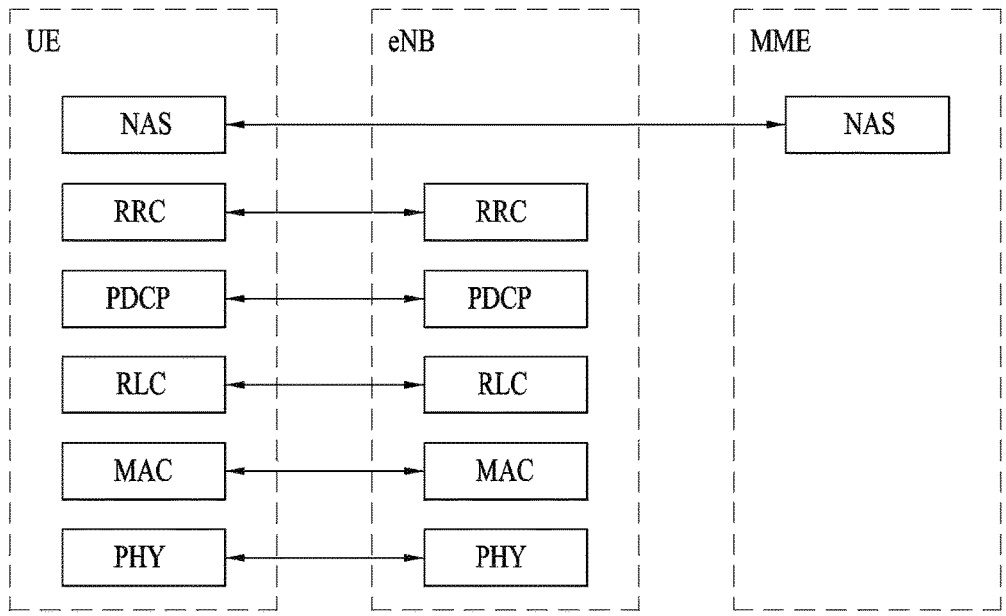
(A) CONTROL-PLANE PROTOCOL STACK
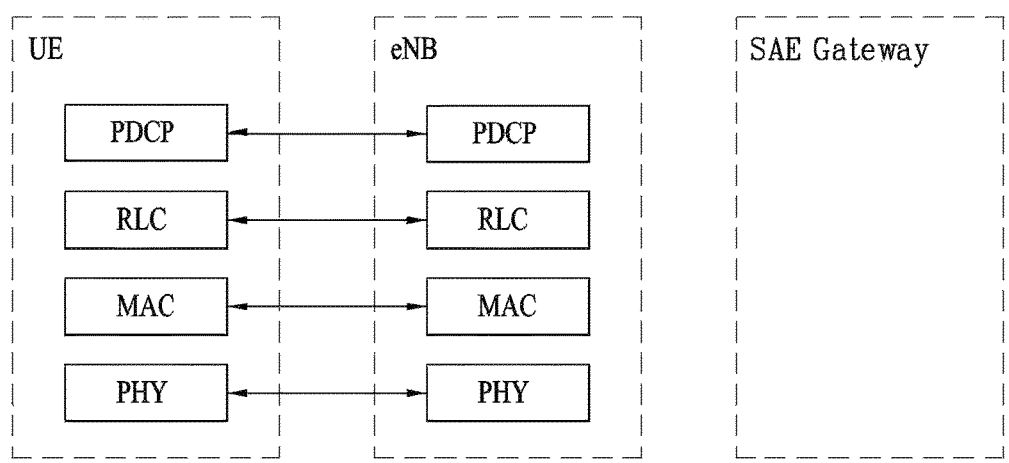
(B) USER-PLANE PROTOCOL STACK

FIG. 8

ACK for current data,
NACK for previous data
ACK for current data,
ACK for previous data NACK for current data,
NACK for previous data
NACK for current data,
ACK for previous data (a)

ACK for current data,
ACK for previous data

ACK for current data,
NACK for previous data

NACK for current data,
NACK for previous data
NACK for current data,
ACK for previous data (b)

ACK for current data,
ACK for previous data

NACK for previous data

NACK for current data,
ACK for previous data (c)

METHOD FOR RECEIVING DOWNLINK SIGNAL BY TERMINAL IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2017/002547, filed on Mar. 9, 2017, which claims the benefit of U.S. Provisional Application No. 62/306,007, filed on Mar. 9, 2016. The disclosures of the prior applications are incorporated by reference in their entirety.

TECHNICAL FIELD

The present invention relates to a wireless communication system, and more particularly, to a method for receiving a downlink signal by means of a user equipment in a wireless communication system and a device therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the aforementioned discussion, an object of the present invention is to provide a method for receiving a downlink signal by a user equipment in a wireless communication system and a device therefor.

Technical Solution

According to one embodiment of the present invention, a method for transmitting and receiving a signal between a user equipment (UE) and an eNB in a wireless communication system comprises the steps of receiving a first packet from the eNB; transmitting a Negative-ACK (NACK) response to the first packet to the eNB; receiving a second packet from the eNB and determining whether an error has occurred in the NACK response to the first packet; and transmitting, to the eNB, information as to whether an error has occurred in the NACK response to the first packet.

Meanwhile, according to another embodiment of the present invention, a user equipment (UE) in a wireless communication system comprises a wireless communication module; and a processor for receiving a first packet from an eNB and transmitting a Negative-ACK (NACK) response to the first packet to the eNB, wherein the processor receives a second packet from the eNB and determines whether an error has occurred in the NACK response to the first packet, and transmits, to the eNB, information as to whether an error has occurred in the NACK response to the first packet.

Preferably, the step of determining whether an error has occurred in the NACK response to the first packet includes determining that an error has occurred in the NACK response if the second packet is not retransmission of the first packet.

Preferably, the information as to whether an error has occurred in the NACK response to the first packet is transmitted to the eNB together with ACK/NACK response to the second packet, and if the error has occurred in the NACK response to the first packet, the ACK/NACK response to the second packet is transmitted through a first uplink resource, and if the error has not occurred in the NACK response to the first packet, the ACK/NACK response to the second packet is transmitted through a second uplink resource.

Additionally, the method further comprises the steps of determining a transmission power for transmitting the ACK/NACK response to the second packet; and adding a predetermined offset to the determined transmission power if the error has occurred in the NACK response to the first packet.

Also, the ACK/NACK response to the second packet is transmitted together with error occurrence information of the NACK response to the first packet if the error has not occurred in the NACK response to the first packet, and the ACK/NACK response to the second packet is omitted if the error has occurred in the NACK response to the first packet.

Moreover, it is regarded that the error has not occurred in the NACK response to the first packet if retransmission performed for the first packet is a threshold value or more.

Advantageous Effects

According to the embodiment of the present invention, the time for repairing a packet error or link failure, which may occur during communication in a wireless communication system, may efficiently be reduced, and resource efficiency and reliability may be enhanced.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 is a diagram illustrating structures of a control plane and a user plane of a radio interface protocol between a UE and an E-UTRAN based on the 3GPP radio access network specification.

FIG. 8 is a diagram illustrating an example that constellation of HARQ-ACK signal is controlled in accordance with the embodiment of the present invention.

BEST MODE FOR CARRYING OUT THE INVENTION

Figure 1:
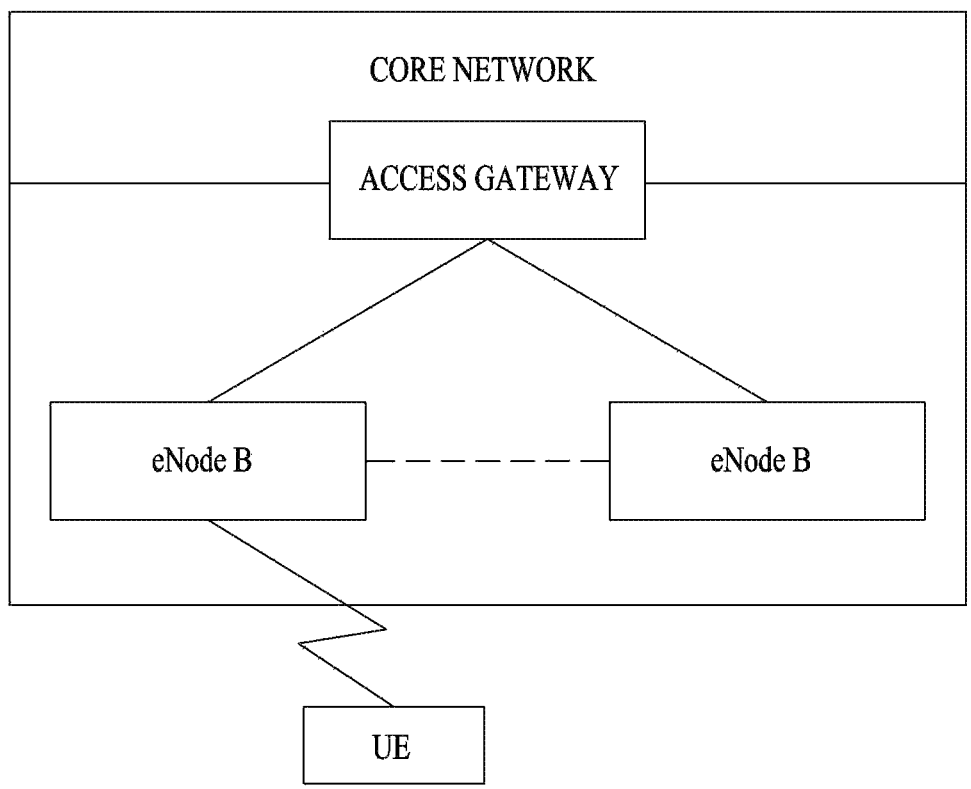
FIG. 1 is a diagram schematically illustrating a network structure of an E-UMTS as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In particular, although the embodiments of the present invention are described in the present specification on the basis of FDD, this is exemplary only. The embodiments of the present invention may be easily modified and applied to H-FDD or TDD.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
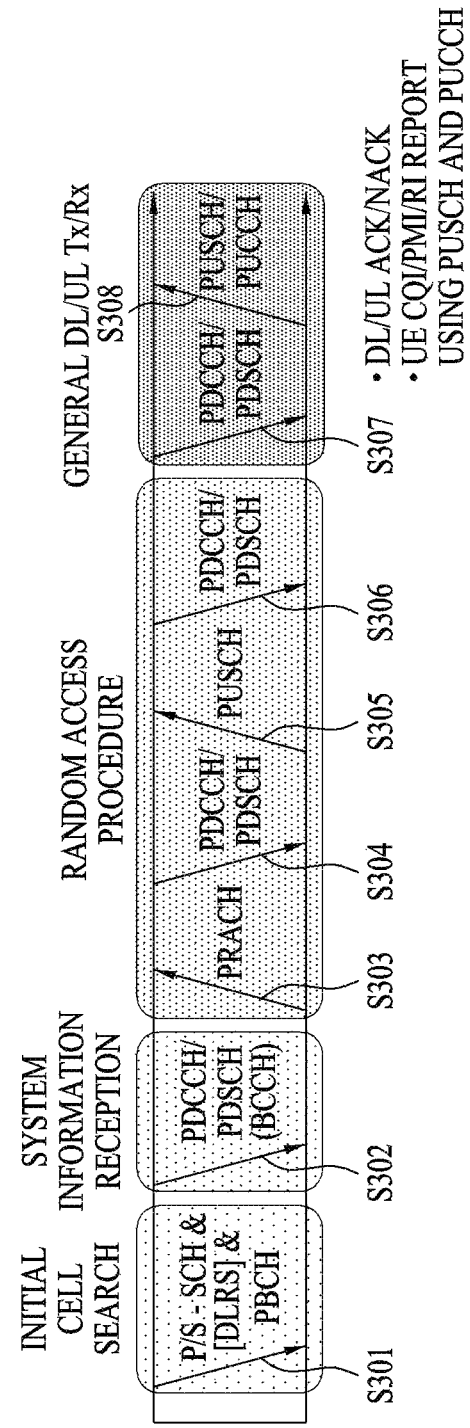
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
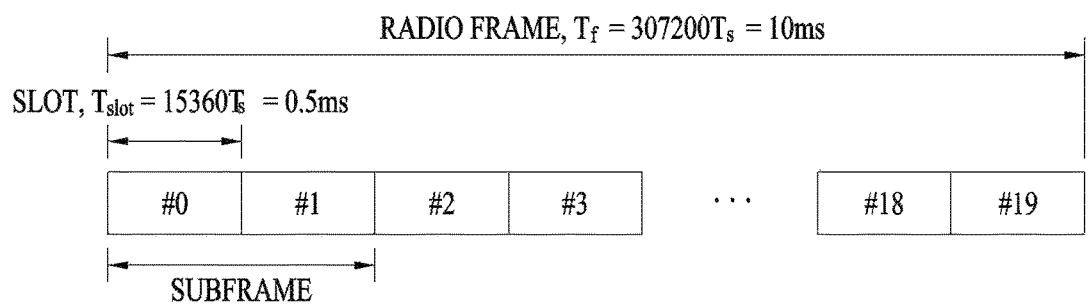
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
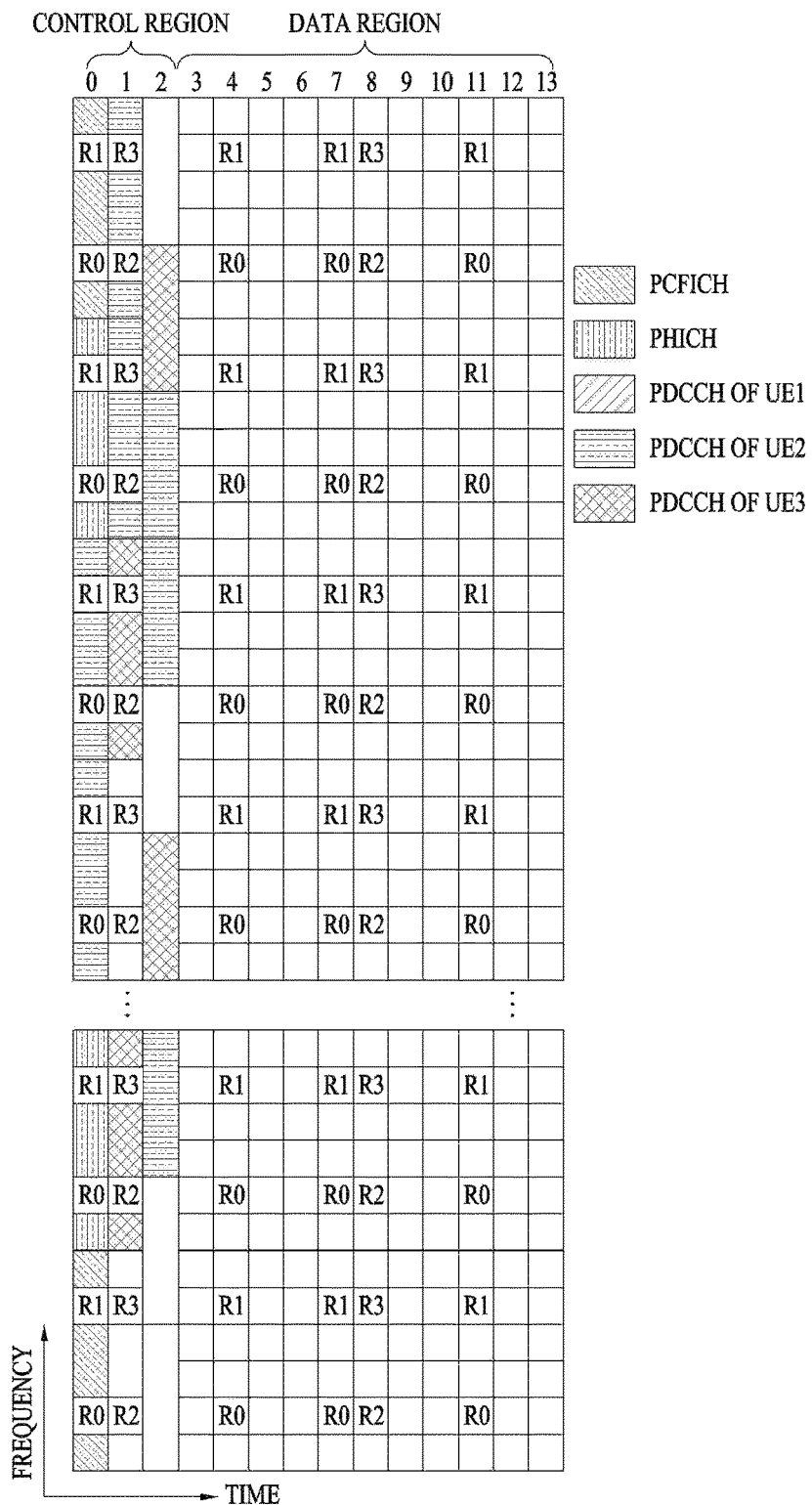
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
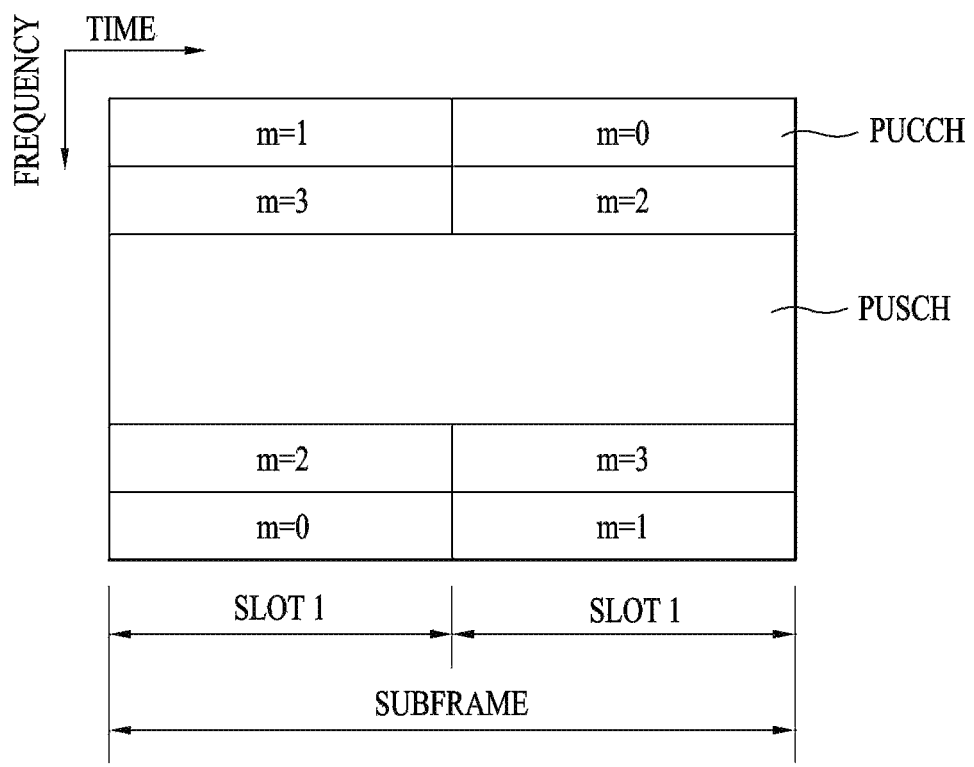
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Based on the aforementioned discussion, the present invention suggests a method for reinforcing reliability in HARQ operation for repairing a packet error during a process of performing wireless communication. Particularly, the present invention may be applied to a next generation communication system, which requires high reliability and low latency, such as a vehicle control signal to be transmitted to an autonomous vehicle. For example, the legacy communication system aims to obtain a block error rate (BLER) of 10-2 or less which is conventionally considered. However, the next generation communication system aims to obtain BLER of a value smaller than 10-2. For example, since the next generation communication system aims to obtain BLER of 10-5 or less, very high reliability may be required. Since this service requires very low latency, successful transmission and reception should be completed within a very short restrictive time.

Although the following description is based on a downlink where a transmitter is an eNB and a transmitter is a UE, the description is applicable to an uplink where the UE is a transmitter and the eNB is a receiver or device-to-device (D2D) communication for directly transmitting data from a UE to another UE.

Although the receiver has attempted to receive data from the transmitter but failed in decoding, the receiver transmits NACK signal to the transmitter. However, if an error occurs in this NACK signal transmission, the transmitter regards that the corresponding receiver has successfully received data and then attempts transmission of next data. In this case, the corresponding data is not transmitted from a radio link for a while, and retransmission cannot be performed until an ARQ operation of a higher layer, for example, an operation for identifying absence of the corresponding data through arrival of subsequent data from the higher layer in a state that a specific data is omitted for a specific time and requesting retransmission is performed. However, if the corresponding data should be transmitted quickly within a short time, it is difficult to use a repair operation in the higher layer.

This problem may be solved in such a manner that the receiver previously identifies and resolves an error in NACK signal transmission in a physical layer and MAC layer. If reception of the corresponding data has been successfully performed in the receiver in a state that the transmitter has transmitted data to a specific HARQ process ID, the transmitter may indicate, to the receiver that this transmission is transmission of new data not retransmission while transmitting new data to the same HARQ process ID. For example, a new data indicator (NDI) may be defined as one field of a scheduling message, and a value of the corresponding field may be changed whenever new data is transmitted. Therefore, in a state that the receiver has been failed to receive the data transmitted to the specific HARQ process ID, if the receiver receives a scheduling message indicating that new data is transmitted to the same HARQ process ID, the receiver may predict occurrence of the problem and may be operated to quickly notify the transmitter of the fact that recovery of previous data is required.

Figure 7:
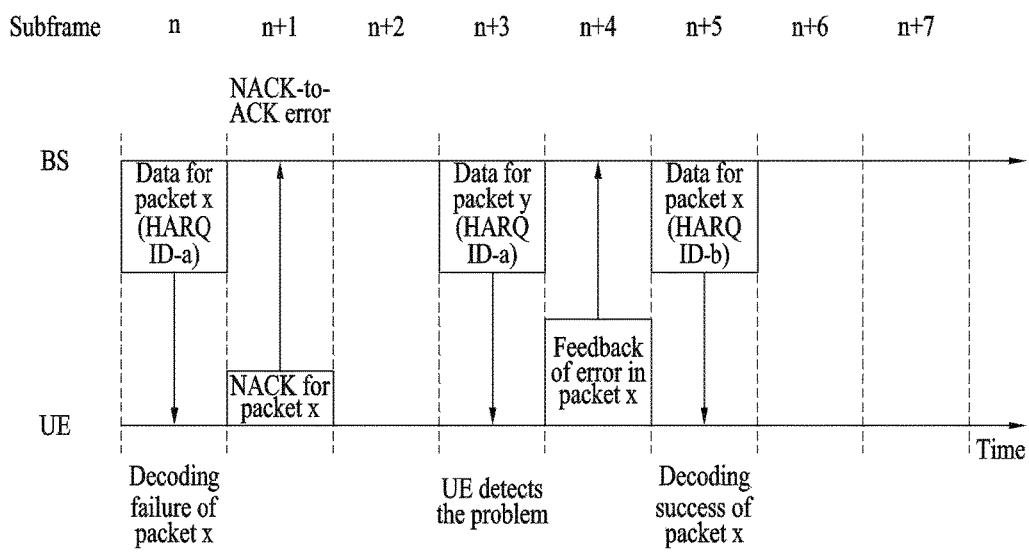
FIG. 7 is a diagram illustrating an example of a feedback of HARQ-ACK error in accordance with the embodiment of the present invention.

FIG. 7 is a diagram illustrating an example of a feedback of HARQ-ACK error in accordance with the embodiment of the present invention.

Referring to FIG. 7, although the UE has failed in reception with respect to a packet x at a subframe #n, the eNB may regard a success of reception due to an error of HARQ-ACK at a subframe #n+1. In this case, a problem occurs in that the eNB transmits a new packet y to the same HARQ process ID at a subframe #(n+3) in FIG. 7. At this time, the UE is operated to retransmit the packet x at a subframe #(n+5) by notifying the eNB of the problem, that is, the error of HARQ-ACK at a subframe #(n+4).

As an example that the receiver notifies the transmitter of the problem, the receiver may include information on reception success/failure for previous data previously transmitted to the corresponding HARQ process, for example, previous data transmitted most recently, that is, error information of HARQ-ACK in addition to HARQ-ACK for data transmitted at a specific time in a specific HARQ process. As a result, the transmitter may quickly identify whether the receiver has normally received the previous data. For this operation, as a detailed implementation example for reporting corresponding information from the receiver to the transmitter, at least one of the followings 1) to 3) may be used.

1) Transmission as a Part of Data Transmitted from the Receiver

First of all, when the receiver notifies the transmitter of a reception state of data previously transmitted from the specific HARQ process, the receiver may consider this information to be transmitted to the corresponding transmitter as a part of data transmitted to the corresponding transmitter. For example, if the receiver is the UE and the transmitter is the eNB, the receiver transmits the information as a part of uplink data transmission. Particularly, the receiver may indicate whether a packet transmitted just before a packet which is currently transmitted from each HARQ process has been successfully received.

In more detail, if eight HARQ processes are operated, the receiver may indicate whether data transmitted just before data for currently operating HARQ in each HARQ process has been successfully received through a signal of 8 bits. This signal may be added to a header of data information in the form of MAC control element (CE) and channel coded together with data, or may be transmitted to some resource element (RE) after separate channel coding is applied and data may be operated so as not to be mapped into the corresponding RE.

2) Use of Separate HARQ-ACK Resource

The receiver may feed back whether the previous data has been successfully received using a separate HARQ-ACK resource. In this case, the previous data may mean only the previous data transmitted using the same HARQ process ID. For example, the receiver may feed back information on data currently received from a scheduled HARQ process with respect to a first resource and feed back information on data previously received from the corresponding HARQ process with respect to a second resource in a state that two kinds of HARQ-ACK resources are allocated to the receiver.

Alternatively, the receiver may feed back corresponding information through selection of two kinds of HARQ-ACK resources. For example, the receiver may feed back information on currently received from the corresponding HARQ process by using the first resource when previous data of the scheduled HARQ process has been successfully received. However, the receiver may feed back information on data currently received from the corresponding HARQ process by using the second resource when reception of the previous data of the scheduled HARQ process has been failed.

In the above operation, the respective resources may be designated separately, or may be associated with each other. As an example of resources associated with each other, a position of the second resource may be derived from a position of the first resource, and may be defined such that the second resource may be next resource of the first resource.

3) Simultaneous Transmission of Previous Data A/N and Current Data A/N

The receiver may transmit HARQ-ACK signal by generating information on data currently received from the scheduled HARQ process and information on previously received data as A/N. For example, HARQ-ACK signal is comprised of 2 bits, wherein the first bit may be information on currently received data, and the second bit may correspond to information on previously received data.

Preferably, if reception of the previous data has been failed, the receiver should notify the transmitter of reception failure quickly if possible such that retransmission should be performed within allowable latency. Therefore, a portion indicating that reception of the previous data has been failed should be transmitted more reliably, whereby transmission may be implemented by controlling constellation of the HARQ-ACK signal.

FIG. 8 is a diagram illustrating an example that constellation of HARQ-ACK signal is controlled in accordance with the embodiment of the present invention. Particularly, in FIG. 8, it is assumed that information on currently received data and information on previously received data are respectively expressed as 1 bit.

In this case, although HARQ-ACK may be based on conventional QPSK constellation as shown in (a) of FIG. 8, an interval between two states corresponding to NACK of the previous data may be narrowed to increase a distance from the state corresponding to ACK of the previous data as shown in (b) of FIG. 8. In more detail, in (c) of FIG. 8, the interval between the two states corresponding to NACK of the previous data may be narrowed extremely so as not to transmit HARQ-ACK for the current data if the previous data is NACK, whereby entire states may be controlled by three.

In performing the aforementioned operations, if the receiver initially receives data from the transmitter, success of the previous data cannot be designated. In this case, the receiver may be operated to regard that the previous data has been successfully received. Also, if the transmitter newly initiates data transmission in a state that it does not transmit data for a certain time, since it is likely that latency has already passed even though the receiver has failed in reception of the previous data, it may be regarded that the receiver initially receives data. As a result, if data transmission is newly initiated, detection performance of HARQ-ACK of the transmitter may be enhanced.

Also, in the present invention, it is preferable to restrictively apply this operation to a specific service having high latency request and high reliability request. For example, whether to perform this operation may be designated through a scheduling message every time. Otherwise, specific HARQ processes may previously be designated and this operation may be defined to be performed only on the corresponding HARQ processes. Otherwise, a set of specific subframes may previously be designated and this operation may be defined to be performed only if data transmission is performed on the subframe.

Moreover, in performing the operation of the present invention, if an error still occurs even after the previous data is retransmitted through a long time, it may be impossible to repair the error within latency request even though the fact of occurrence of the error is notified to the transmitter. Therefore, the operation of the present invention may be defined to be restrictively performed only if retransmission of the previous data has occurred at a certain number of times or less. If retransmission exceeds a designated number of retransmission times, the operation may be performed on the assumption that decoding of the previous data has been successfully performed regardless of the actual decoding result, or a general operation for not feeding back decoding or non-decoding of the previous data may be performed. Otherwise, the receiver transmits whether decoding of the previous data most recently transmitted within a certain time from a feedback transmission timing has been successfully performed, and may be operated on the assumption that decoding of the previous data has been successfully performed as described above if there were no previous data transmitted within the corresponding certain time or may perform the general operation for not feeding back decoding or non-decoding of the previous data.

As described above, if reception failure of the previously received data should be indicated, since this feedback should be transferred quickly and exactly, a signal which includes failure information of the previously received data may be transmitted at a higher power. For example, if the signal includes failure information of the previously received data after a transmission power is determined by a general power control scheme, a final transmission power may be determined by adding a predetermined offset to the determined transmission power.

Figure 9:
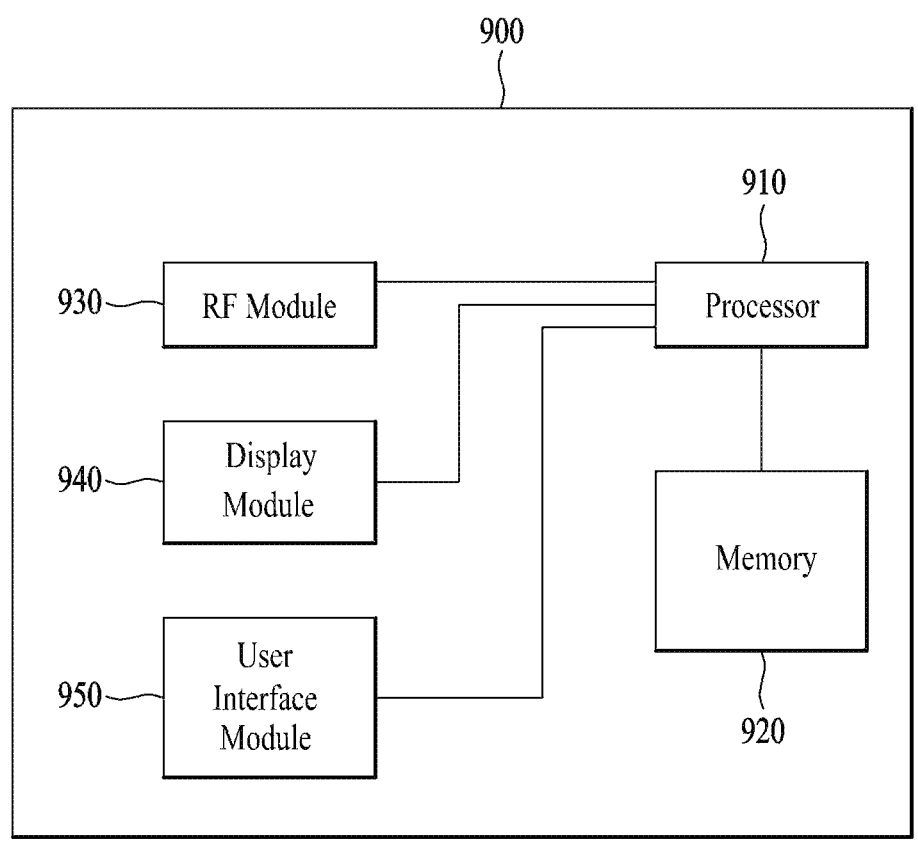
FIG. 9 is a block diagram of a communication device according to an embodiment of the present invention.

FIG. 9 is a block diagram of a communication device according to an embodiment of the present invention.

Referring to FIG. 9, a communication device 900 includes a processor 910, a memory 920, a Radio Frequency (RF) module 930, a display module 940 and a user interface module 950.

The communication device 900 is shown for convenience of description and some modules thereof may be omitted. In addition, the communication device 900 may further include necessary modules. In addition, some modules of the communication device 900 may be subdivided. The processor 910 is configured to perform an operation of the embodiment of the present invention described with respect to the drawings. For a detailed description of the operation of the processor 910, reference may be made to the description associated with FIGS. 1 to 8.

The memory 920 is connected to the processor 910 so as to store an operating system, an application, program code, data and the like. The RF module 930 is connected to the processor 910 so as to perform a function for converting a baseband signal into a radio signal or converting a radio signal into a baseband signal. The RF module 930 performs analog conversion, amplification, filtering and frequency up-conversion or inverse processes thereof. The display module 940 is connected to the processor 910 so as to display a variety of information. As the display module 940, although not limited thereto, a well-known device such as a Liquid Crystal Display (LCD), a Light Emitting Diode (LED), or an Organic Light Emitting Diode (OLED) may be used. The user interface module 950 is connected to the processor 910 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the method for receiving a downlink signal by a UE in a wireless communication system and the device therefor have been described based on the 3GPP LTE system, the method and the device are applicable to various wireless communication systems in addition to the 3GPP LTE system.

The invention claimed is:

1. A method for transmitting and receiving a signal with an eNB by a user equipment (UE) in a wireless communication system, the method comprising:
   receiving a scheduling message informing the UE of a first feedback mode or a second feedback mode;
   receiving a first packet from the eNB;
   transmitting a Negative-ACK (NACK) response to the first packet to the eNB;
   receiving a second packet from the eNB;
   determining whether an error has occurred in the NACK response to the first packet, and transmitting, to the eNB, information as to whether an error has occurred in the NACK response to the first packet, in response that the received scheduling message informs the UE of the first feedback mode; and
   transmitting, to the eNB, an Acknowledgement (ACK) response or a NACK response to the second packet without determining whether an error has occurred in the NACK response to the first packet, in response that the received scheduling message informs the UE of the second feedback mode,
   wherein the error occurred in the NACK response to the first packet is handled by an ARQ (Automatic Repeat Request) operation by a higher layer, in response that the received scheduling message informs the UE of the second feedback mode.

2. The method according to claim 1, wherein the step of determining whether an error has occurred in the NACK response to the first packet includes determining that an error has occurred in the NACK response if the second packet is not retransmission of the first packet.

3. The method according to claim 1, wherein the information as to whether an error has occurred in the NACK response to the first packet is transmitted to the eNB together with ACK/NACK response to the second packet, and if the error has occurred in the NACK response to the first packet, the ACK/NACK response to the second packet is transmitted through a first uplink resource, and if the error has not occurred in the NACK response to the first packet, the ACK/NACK response to the second packet is transmitted through a second uplink resource.

4. The method according to claim 1, further comprising the steps of:
   determining a transmission power for transmitting the ACK/NACK response to the second packet; and adding a predetermined offset to the determined transmission power if the error has occurred in the NACK response to the first packet.

5. The method according to claim 1, wherein the step of determining whether an error has occurred includes regarding that the error has not occurred in the NACK response to the first packet if retransmission performed for the first packet is a threshold value or more.

6. The method according to claim 1, wherein the ACK/NACK response to the second packet is transmitted together with error occurrence information of the NACK response to the first packet if the error has not occurred in the NACK response to the first packet, and the ACK/NACK response to the second packet is omitted if the error has occurred in the NACK response to the first packet.

7. A user equipment (UE) in a wireless communication system, the UE comprising:
a wireless communication module; and
a processor for receiving a scheduling message informing the UE of a first feedback mode or a second feedback mode, and receiving a first packet from an eNB and transmitting a Negative-ACK (NACK) response to the first packet to the eNB,
wherein the processor receives a second packet from the eNB;
determines whether an error has occurred in the NACK response to the first packet, and transmits, to the eNB, information as to whether an error has occurred in the NACK response to the first packet in response that the received scheduling message informs the UE of the first feedback mode; and
transmits, to the eNB, an Acknowledgement (ACK) response or a NACK response to the second packet without determining whether an error has occurred in the NACK response to the first packet, in response that the received scheduling message informs the UE of the second feedback mode,
wherein the error occurred in the NACK response to the first packet is handled by an ARQ (Automatic Repeat Request) operation by a higher layer, in response that the received scheduling message informs the UE of the second feedback mode.

8. The UE according to claim 7, wherein the processor determines that an error has occurred in the NACK response if the second packet is not retransmission of the first packet.

9. The UE according to claim 7, wherein the information as to whether an error has occurred in the NACK response to the first packet is transmitted to the eNB together with ACK/NACK response to the second packet, and if the error has occurred in the NACK response to the first packet, the ACK/NACK response to the second packet is transmitted through a first uplink resource, and if the error has not occurred in the NACK response to the first packet, the ACK/NACK response to the second packet is transmitted through a second uplink resource.

10. The UE according to claim 7, wherein the processor determines a transmission power for transmitting the ACK/NACK response to the second packet, and adds a predetermined offset to the determined transmission power if the error has occurred in the NACK response to the first packet.

11. The UE according to claim 7, wherein the processor regards that the error has not occurred in the NACK response to the first packet if retransmission performed for the first packet is a threshold value or more.

12. The UE according to claim 7, wherein the ACK/NACK response to the second packet is transmitted together with error occurrence information of the NACK response to the first packet if the error has not occurred in the NACK response to the first packet, and the ACK/NACK response to the second packet is omitted if the error has occurred in the NACK response to the first packet.

* * * * *